United States Patent
Johnson et al.

(10) Patent No.: US 9,897,448 B2
(45) Date of Patent: Feb. 20, 2018

(54) SYSTEMS AND METHODS FOR MULTIPLE SPECIES ATOM INTERFEROMETRY

(71) Applicant: THE CHARLES STARK DRAPER LABORATORY, INC., Cambridge, MA (US)

(72) Inventors: David M. S. Johnson, Somerville, MA (US); David L. Butts, Boston, MA (US); Richard E. Stoner, Framingham, MA (US); Tom Thorvaldsen, Hingham, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 0 days.

(21) Appl. No.: 15/513,118

(22) PCT Filed: Oct. 21, 2015

(86) PCT No.: PCT/US2015/056591
§ 371 (c)(1),
(2) Date: Mar. 21, 2017

(87) PCT Pub. No.: WO2016/069341
PCT Pub. Date: May 6, 2016

(65) Prior Publication Data
US 2017/0299389 A1    Oct. 19, 2017

Related U.S. Application Data

(60) Provisional application No. 62/073,893, filed on Oct. 31, 2014.

(51) Int. Cl.
*G01C 19/58* (2006.01)
*G01P 15/093* (2006.01)

(52) U.S. Cl.
CPC ............ *G01C 19/58* (2013.01); *G01P 15/093* (2013.01)

(58) Field of Classification Search
CPC ........ G01C 19/00; G01C 19/58; G01C 19/66; G01P 15/00; G01P 15/02; G01P 15/08; G01P 15/093; G01P 9/02; G01B 9/02
See application file for complete search history.

(56) References Cited

U.S. PATENT DOCUMENTS 5,004,325 A    4/1991  Glass et al.
5,274,231 A   12/1993  Chu et al.
(Continued)

FOREIGN PATENT DOCUMENTS

WO    2014/145233 A1    9/2014

OTHER PUBLICATIONS

Band, Y.B., "Chirped-light-field atomic-beam splitter for atom interferometry", Physical Review A, vol. 47, No. 6, 1993, pp. 4970-4974.
(Continued)

*Primary Examiner* — David E Smith
(74) *Attorney, Agent, or Firm* — Lando & Anastasi, LLP

(57) ABSTRACT

An inertial measurement apparatus based on atom interferometry. In one example, the inertial measurement apparatus includes a vacuum chamber, first and second atom capture sites housed within the vacuum chamber, each of the first and second atom capture sites being selectively configured to trap and cool first and second atom samples of distinct atom species, an atom interferometry region disposed between the first and second atom capture sites, and first and second atom interferometers operating in the atom interferometry region, the first atom interferometer being configured to generate a first measurement corresponding to a common inertial input based on the first atom sample, and
(Continued)

the second atom interferometer being configured to generate a second measurement corresponding to the same common inertial input based on the second atom sample.

20 Claims, 7 Drawing Sheets

(56) References Cited

U.S. PATENT DOCUMENTS

| | | | |
|---|---|---|---|
| 5,274,232 A | 12/1993 | Chu et al. | |
| 6,042,603 A | 3/2000 | Fisher et al. | |
| 7,317,184 B2 | 1/2008 | Kasevich et al. | |
| 7,816,643 B2 | 10/2010 | Hyodo | |
| 9,019,506 B1* | 4/2015 | Black | G01B 9/02 356/450 |
| 2014/0016118 A1 | 1/2014 | Compton et al. | |
| 2014/0190254 A1* | 7/2014 | Bouyer | G01V 7/04 73/382 G |
| 2015/0090028 A1* | 4/2015 | Zahzam | G21K 1/006 73/382 R |

OTHER PUBLICATIONS

Bateman et al., "Fractional adiabatic passage in two-level systems Mirrors and beam splitters for atomic interferometry", Physical Review A, vol. 76, No. 1, 2007, pp. 013416-1 to 013416-9.

Butts et al., "Coherent population trapping in Raman-pulse atom interferometry" Physical Review A, vol. 84, No. 4, 2011, pp. 043613-1 to 043613-8.

Butts et al., "Light pulse atom interferometry at short interrogation times", Journal of the Optical Society of America, vol. 28, No. 3, 2011, pp. 416-421.

Chelkowski et al., "Raman Chirped Adiabatic Passage: a New Method of Selective Excitation of High Vibrational States", Journal of Raman Spectroscopy, vol. 28, 1997, pp. 459-466.

Kotru et al., "Atom Interferometry via Raman Chirped Adiabatic Passage", CLEO Technical Digest, OSA, 2012.

Kovachy et al., "Adiabatic-rapid-passage multiphoton Bragg atom optics", Physical Review A, vol. 86, No. 1, 2012, pp. 011606-1 to 011606-5.

Malinovsky et al., "General theory of population transfer by adiabatic rapid passage with intense, chirped laser pulses", The European Physical Journal D, vol. 14, 2001, pp. 147-155.

Peik et al., "Bloch oscillations of atoms, adiabatic rapid passage, and monokinetic atomic beans", Physical Review A, vol. 55, No. 4, 1997, pp. 2989-3001.

Pfeifer et al., "Heterodyne Mixing of Laser Fields for Temporal Gating of High-Order Harmonic Generation", Physical Review Letters, vol. 97, No. 16, 2006, pp. 163901-1 to 163901-4.

Pfeifer et al., "Time-resolved spectroscopy of attosecond quantum dynamics", Chemical Physics Letters, vol. 463, 2008, pp. 11-24.

Raith et al., "Attosecond twin-pulse control by generalized kinetic heterodyne mixing", Optics Letters, vol. 36, No. 2, 2011, pp. 283-285.

Stoner et al., "Analytical framework for dynamic light pulse atom interferometry at short interrogation times", Journal of the Optical Society of America, vol. 28, No. 10, 2011, pp. 2418-2429.

Timmons et al., "Radiation Exposure of Distributed-Feedback Lasers for Use in Atom Trapping and Atom Interferometry", IEEE Transactions on Nuclear Science, vol. 58, No. 2, 2011, pp. 490-498.

Canuel et al., "Six-Axis Inertial Sensor Using Cold-Atom Interferometry", Physical Review Letters, vol. 97, No. 1, 2006, pp. 010402-1 to 010402-4.

International Search Report and Written Opinion for application No. PCT/US2015/056591 dated Jan. 11, 2016.

* cited by examiner

SYSTEMS AND METHODS FOR MULTIPLE SPECIES ATOM INTERFEROMETRY

FEDERALLY SPONSORED RESEARCH

This invention was made with government support under FA8650-13-C-7325 awarded by the Department of the Air Force. The U.S. government has certain rights in the invention.

RELATED APPLICATIONS

This application is a national stage application under 35 U.S.C. §371 of International Application No. PCT/US2015/056591 titled "SYSTEMS AND METHODS FOR MULTIPLE SPECIES ATOM INTERFEROMETRY," filed Oct. 21, 2015, which claims priority from U.S. Provisional Application No. 62/073,893 titled "SYSTEMS AND METHODS FOR MULTIPLE SPECIES ATOM INTERFEROMETRY," filed Oct. 31, 2014, each of which is incorporated herein by reference in their entirety for all purposes.

BACKGROUND

Inertial navigation systems often rely on the Global Positioning System (GPS) to provide accurate positioning information that supplements inertial position information derived from inertial measurement units (IMU) having accelerometers and gyroscopes, so as to adjust for inaccuracies and errors that accumulate over time. However, GPS navigation may be unreliable or may not be available in certain circumstances. Atom interferometry, and more specifically light-pulse atom interferometry (LPAI) has found applications in various fields including inertial navigation. Atom interferometers may provide precise inertial measurements, for example, to supplement conventional inertial measurement units to allow precise inertial navigation.

Many implementations of atom interferometry in the measurement of kinematic properties of an entity such as its velocity and acceleration involve the use of the Raman process to induce internal energy transitions and thus affect the internal energy state of the entity, as well as other kinematic properties such as its momentum or velocity. More precisely, pulses of electromagnetic energy are applied to the entity to stimulate transitions between non-radiative energy levels. The detuning of the electromagnetic pulses, i.e., the difference between the energy levels of the transition and the energy imparted by the electromagnetic pulses allows one to control the distribution of velocities among the entities. Precise control of the velocity distribution permits high accuracy measurements of properties such as velocities and accelerations. In turn, such precise measurements allow one to build more accurate kinematic sensors such as accelerometers and gyroscopes.

In the conventional implementation, each combined LPAI accelerometer and gyroscope uses two counter-propagating laser-cooled atomic test masses, of a single species, launched at an initial velocity (typically, a few meters per second), and interrogated by three equally spaced laser beams using Raman spectroscopy. The test masses are discarded or recaptured after measurement. The sum and differences of the two measurements provides the acceleration and the rotation rate, respectively, of the system.

Conventional LPAI implementations are larger systems which require substantially more volume than is traversed by the atoms due to the associated mechanisms required to prepare, cool, and trap the atomic sample, resulting in the large size of these systems. Additionally, LPAIs typically have dead time between measurements to cool and prepare the atomic samples. This dead time reduces the maximum measurement rate for the LPAI. By the sampling theorem, this limits the bandwidth of an LPAI based IMU to half of the measurement rate. In order to avoid the bandwidth limit imposed by sample preparation, multiple (two or three) time-multiplexed LPAI instruments may be used for each axis, which again increases the size of the overall system, but allows for continuously sampling the inertial signal. Furthermore, in certain applications it is desirable to obtain inertial measurements for multiple axes. In order to create an LPAI based IMU having six Degrees of Freedom (6-DOF, three vector-space spanning (typically orthogonal) acceleration measurements and three rotation rate (or angle) measurements), three separate LPAI instruments (each functioning as an accelerometer and gyroscope) may typically be combined, as is standard practice for constructing conventional IMUs. Thus, creating a 6-DOF LPAI-based IMU may conventionally require twelve to eighteen separate LPAI instruments to provide a continuously sampling inertial instrument. By having multiple LPAI instruments, each having its own atom sample capture mechanisms, there is a substantial volume increase over what is theoretically necessary.

SUMMARY OF THE INVENTION

Aspects and embodiments relate generally to atom interferometry, and more specifically to inertial measurement systems and methods based on atom interferometry incorporating multiple atomic species. Various embodiments provide for light pulse atomic interferometers multiplexing multiple atomic species in either or both of time and space, providing capabilities for continuous cooling and interrogation of various atomic species within a single spatial volume. Various embodiments also provide for multiple species light pulse atomic interferometers capable of simultaneous operation as one or more of an atomic clock, an accelerometer, a magnetometer, and a gyroscope.

According to one embodiment, an inertial measurement apparatus based on atom interferometry comprises a vacuum chamber, first and second atom capture sites housed within the vacuum chamber, each of the first and the second atom capture sites being selectively configured to trap and cool first and second atom samples of distinct atom species, an atom interferometry region disposed between the first and the second atom capture sites, and first and second atom interferometers operating in the atom interferometry region, the first atom interferometer being configured to generate a first measurement corresponding to a common inertial input based on the first atom sample, and the second atom interferometer being configured to generate a second measurement corresponding to the common inertial input based on the second atom sample. The first atom capture site is configured to launch the first atom sample into the atom interferometry region, and to recapture the second atom sample from the atom interferometry following the second measurement, and the second atom capture site is configured to launch the second atom sample into the interferometry region, and to recapture the first atom sample from the atom interferometry region following the first measurement.

In one example, each of the first and the second atom capture sites includes a magneto-optic trap. In another example, each of the first and the second atom capture sites includes a magnetic trap. In yet another example, each of the first and the second atom capture sites includes an optical dipole trap. The distinct atom species may include $^{85}$Rb and $^{87}$Rb, for example. In one example, the first and the second atom capture sites are configured to launch captured atoms at an initial non-zero velocity. In another example, the first atom interferometer is configured to apply a first light pulse sequence to atoms of the first atom sample as the atoms traverse the atom interferometry region, and the second atom interferometer is configured to provide a second light pulse sequence to atoms of the second atom sample as the atoms traverse the atom interferometry region. In one example, the first and second light pulse sequences are Raman pulse sequence. In another example, the first and second light pulse sequences are pi/2-pi-pi/2 sequences. In another example, the first atom interferometer includes a first optical assembly configured to provide the first light pulse sequence, and the second atom interferometer includes a second optical assembly configured to provide the second light pulse sequence.

According to one embodiment, an inertial measurement apparatus based on atom interferometry comprises a vacuum chamber, first and second atom capture sites housed within the vacuum chamber, each of the first and the second atom capture sites being selectively configured to trap and cool two atomic samples of distinct atom species, an atom interferometry region disposed between the first and second atom capture sites, and first, second, third, and fourth atom interferometers operating in the atom interferometry region for two atomic species trapped at both the first and second capture sites. The first atom interferometer may be configured to generate a first measurement corresponding to a common inertial input based on the first atomic species sample at the first capture site, the second atom interferometer may be configured to generate a second measurement corresponding to the same common inertial input based on the first atomic species sample at the second capture site, the third atom interferometer may be configured to generate a third measurement corresponding to a common inertial input based on the second atomic species sample at the first capture site, and the fourth atom interferometer being configured to generate a fourth measurement corresponding to a common inertial input based on the second atomic species sample at the second capture site. The first atom capture site is configured to launch the first and third atomic sample into the atom interferometry region, and to recapture the second and fourth atomic sample from the atom interferometry following the second and fourth measurements, and the second atom capture site is configured to launch the second and fourth atom sample into the interferometry region, and to recapture the first and third atom sample from the atom interferometry region following the first and third measurements.

In one example, each of the first and second atom capture sites includes a magneto-optical trap. The distinct atom species may include $^{85}$Rb and $^{87}$Rb. In one example, the first and second atom capture sites are configured to launch captured atoms at an initial non-zero velocity. In another example, the first atom interferometer is configured to apply a first light pulse sequence to atoms of the first atomic sample as the atoms traverse the atom interferometry region, the second atom interferometer is configured to provide a second light pulse sequence to atoms of the second atomic sample as the atoms traverse the atom interferometry region, the third atom interferometer is configured to provide a third light pulse sequence to atoms of the third atomic sample as the atoms traverse the atom interferometry region, and the fourth atom interferometer is configured to provide a fourth light pulse sequence to atoms of the fourth atomic sample as the atoms traverse the atom interferometry region. In one example, the first, second, third, and fourth light pulse sequences are Raman pulse sequences. In another example, the first, second, third, and fourth light pulse sequences are pi/2-pi-pi/2 sequences. In another example, the four atom interferometers are formed using the same optical assembly.

According to at least one embodiment, an inertial measurement apparatus based on atom interferometry comprises a vacuum chamber, first and second atom capture sites housed within the vacuum chamber, each of the first and second atom capture sites being selectively configured to trap and cool first and second atom samples of distinct atom species, an atom interferometry region disposed between the first and second atom capture sites, and first and second atom interferometers operating in the atom interferometry region, the first atom interferometer being configured to generate a first measurement corresponding to a common inertial input based on the first atom sample, and the second atom interferometer being configured to generate a second measurement corresponding to the same common inertial input based on the second atom sample. The first atom capture site may be configured to launch the first atom sample into the atom interferometry region, and to recapture the second atom sample from the atom interferometry following the second measurement. The second atom capture site may be configured to launch the second atom sample into the interferometry region, and to recapture the first atom sample from the atom interferometry region following the first measurement. The apparatus may make use of the different physical properties of the multiple atomic species.

According to one example, a separate atom interferometer may be formed from both species at both capture sites, for a total of four atom interferometers. In one example, more than a single atomic species may be trapped at each of the capture sites. According to some examples, any number of capture sites may be used. In another example, any number of interferometers may be formed, more than one atomic species may be used, and any launch velocity may be used.

In one example, the atom interferometry may occur in the same region as the trapping site. In another embodiment, the atom interferometry may occur in a different region than the trapping site.

In another example, there may be only one capture site and the atoms are launched at an initial non-zero velocity. In another example, there may be only one capture site and the atoms are not given an initial velocity with respect to the initial trapping site.

In one example, only one light pulse sequence is applied and it interacts with some or all of the atomic species. In another example, any number of light pulse sequences may be applied.

In one example, an atom interferometer is formed by manipulating at least one atomic species to cause interference.

According to another embodiment, an inertial measurement apparatus based on atom interferometry comprises a vacuum chamber, an atom interferometry region located within the vacuum chamber, at least one atom capture site housed within the vacuum chamber and configured to trap and cool a first atom sample of a first atom species and a second atom sample of a second atom species, the first and the second atom species being distinct from one another and having different physical properties, the at least one atom capture site being configured to launch the first and the second atom samples into the atom interferometry region, and first and second atom interferometers operating in the atom interferometry region, the first atom interferometer being configured to generate a first measurement corresponding to a common inertial input based on the first atom sample, and the second atom interferometer being configured to generate a second measurement corresponding to the common inertial input based on the second atom sample.

In one example, the at least one atom capture site is further configured to recapture the first and the second atom samples from the atom interferometry region following the first and the second measurements, respectively. In one example, the at least one atom capture site includes a first atom capture site and a second atom capture site, the first atom capture site being configured to launch the first atom sample into the atom interferometry region and to recapture the second atom sample from the atom interferometry region following the second measurement, and the second atom capture site being configured to launch the second atom sample into the interferometry region and to recapture the first atom sample from the atom interferometry region following the first measurement.

In another example, the inertial measurement apparatus further comprises a third atom interferometer operating in the atom interferometry region and is configured to generate a third measurement based on the first atom sample. In another example, the inertial measurement apparatus further comprises a fourth atom interferometer operating in the atom interferometry region and configured to generate a fourth measurement based on the second atom sample.

In some examples, the at least one atom capture site includes one of a magneto-optical trap, a magnetic trap, and an optical dipole trap. In one example, the distinct atom species include $^{85}$Rb and $^{87}$Rb. In one example, the at least one atom capture site is configured to launch captured atoms at an initial non-zero velocity. In one example, the first atom interferometer is configured to apply a first light pulse sequence to the first atom sample as the first atom sample traverses the atom interferometry region, and the second atom interferometer is configured to provide a second light pulse sequence to the second atom sample as the second atom sample traverses the atom interferometry region. In another example, the first and the second light pulse sequences are Raman pulse sequences. In one example, the first and the second light pulse sequences are pi/2-pi-pi/2 sequences. In one example, the first atom interferometer includes a first optical assembly configured to provide the first light pulse sequence, and the second atom interferometer includes a second optical assembly configured to provide the second light pulse sequence.

In one example, the atom interferometry region is spatially separated from the at least one atom capture site. In another example, the at least one atom capture site is spatially co-located with the atom interferometry region.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
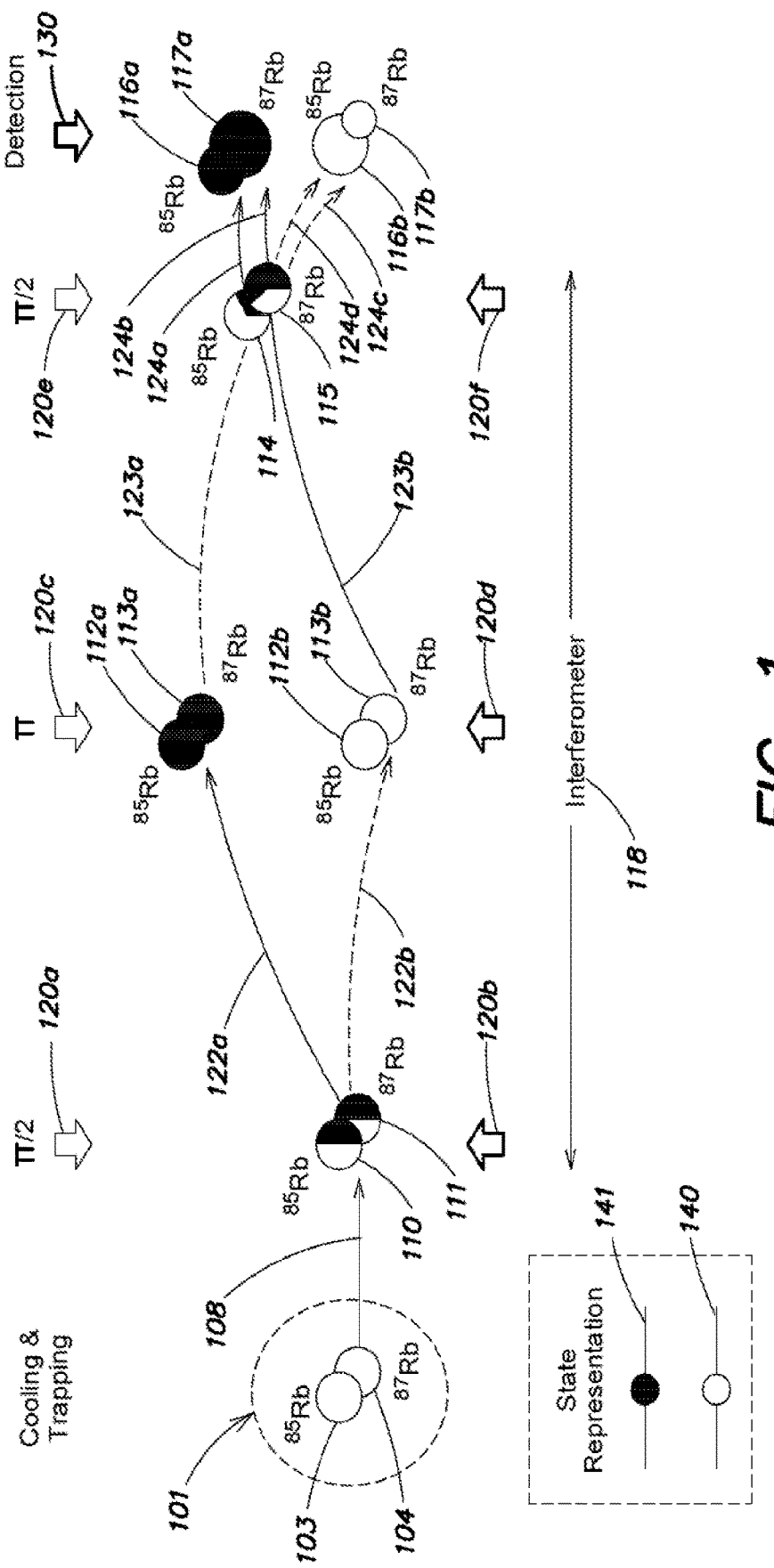
FIG. 1 is a schematic diagram illustrating one example of an atom interferometry measurement sequence using a laser light pulse sequence including a pi/2-pi-pi/2 pulse sequence for two co-located atomic species which originate from the same trapping site, according to aspects of the present invention.

Aspects and embodiments are directed to compact inertial measurement systems based on atom interferometry. Aspects and embodiments are further directed to addressing the challenges discussed above, and providing a sensor system that may be smaller or more compact than conventional systems, while also offering increased bias stability, increased bandwidth, and/or increased degrees of freedom.

As discussed above, conventional atomic sensors using laser-cooled atom samples require "dead time" (no measurements occurring) to prepare the atom samples. Certain aspects and embodiments provide for simultaneous cooling and interrogating of atom samples (e.g., one sample is being cooled while another is being interrogated). In certain examples, increased system bandwidth and/or reduced bias errors may be achieved by simultaneously interrogating multiple atom species and/or isotopes to gain additional information. This arrangement may be used to make duplicate measurements, and thereby reduce systematic errors, or to make different measurements in the same interrogation region, and thereby increase the system bandwidth. Up to N atom species (where N is a positive integer) may be multiplexed. The specificity of the electromagnetic interaction with the different atom species allows for interrogation of one species with little effect on the other(s). The different electromagnetic frequencies used for interrogating each atom species may be independently stabilized to one another via a frequency transfer technique (e.g., using a phase-locked loop, optical frequency comb, transfer cavity, or a direct frequency shift).

Additionally, as discussed further below, certain aspects and embodiments allow for reduced dead time between measurements by recapturing and reusing atom samples.

Recapture of atom samples dramatically decreases the dead-time between measurements by re-using atom samples used in a previous atom interferometer measurement. This reuse reduces the time required to cool the atoms because they are already near operating temperature. Thus, recapturing atom samples reduces cycle time and allows for a substantial increase, such as 10× to 100× increase, in data rate, which translates to a corresponding increase of 10× to 100× in bandwidth compared to a conventional light pulse atom interferometer. Recapturing atom samples enables high speed operation and is applicable to multiplexed as well as sequential systems.

Light pulse atom interferometry (LPAI) has numerous applications. In various embodiments, an LPAI instrument (such as an accelerometer, gyroscope, clock, etc.) may use a plurality of atom samples that are captured and launched substantially simultaneously to generate inertial measurements. In some embodiments, an LPAI gyroscope or a combination of an LPAI gyroscope and accelerometer may use two counter-propagating laser cooled atom samples launched at a few meters per second ($V_L$) and interrogated by three laser beams using Raman (or Bragg) transitions, as discussed further below. Two oppositely launched atom samples (reciprocal operation with substantially parallel trajectories) allows for the ability to distinguish between acceleration and rotation. Acceleration is based on the sum of the two measurements taken from the two oppositely launched atom samples, whereas rotation rate is based on the difference of the measurements. These samples may share the same trajectory (overlapping configuration), or they may be operated along different trajectories. In certain examples, the trajectories are typically equal and opposite, e.g. $vL\_1=-vL\_2$; however, this is not necessarily the case, provided that the velocity vectors are precisely known.

Sample recapture reduces cycle time, and allows for the reduction of the volume of LPAI atomic inertial measurement systems. In particular, an architecture that combines atom sample (test mass) recapture and sequential sampling of each inertial axis may provide a highly compact sensor system. As discussed in more detail below, a system according to certain embodiments may use a combination of atom species or isotopes to make duplicate or complementary measurements in the same volume, while also performing recapture and reuse of the different atom species samples. Accordingly, a compact, multi-use system may be provided.

Embodiments of systems and methods disclosed herein may have applications in various fields, and in particular the field of precision inertial guidance and navigation. For example, embodiments may be used to guide platforms such as strategic missiles, submarines, Unmanned Underwater Vehicles (UUV), Unmanned Aerial Vehicles (UAV), cruise missiles, aircraft, and tactical munitions. Other examples of applications may include commercial aviation, self-driving vehicles, robotic machinery, and personal navigation in GPS denied environments.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
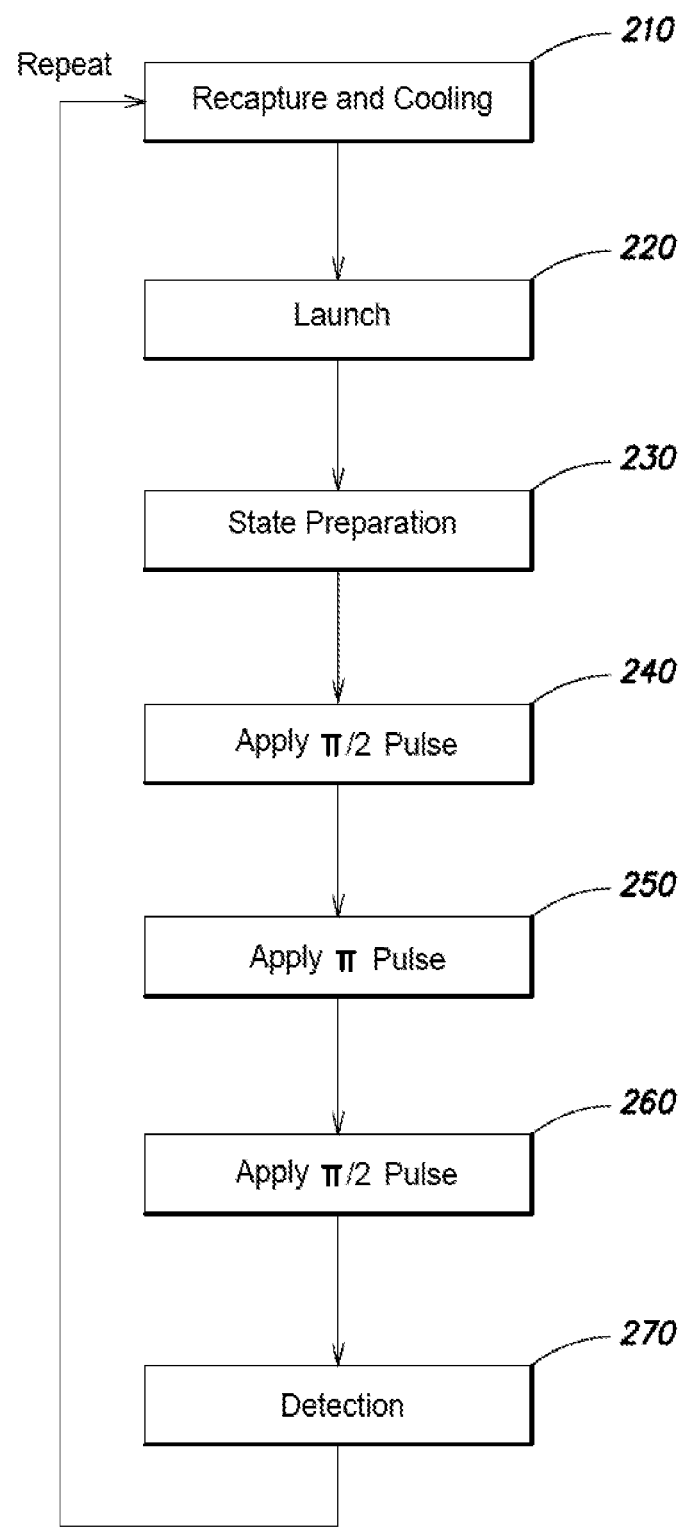
FIG. 2 is a flow diagram of one example of using the properties of the different atomic species to correct inertial measurement made by the atom interferometry measurement sequence corresponding to FIG. 1, according to aspects of the present invention.
Figure 3:
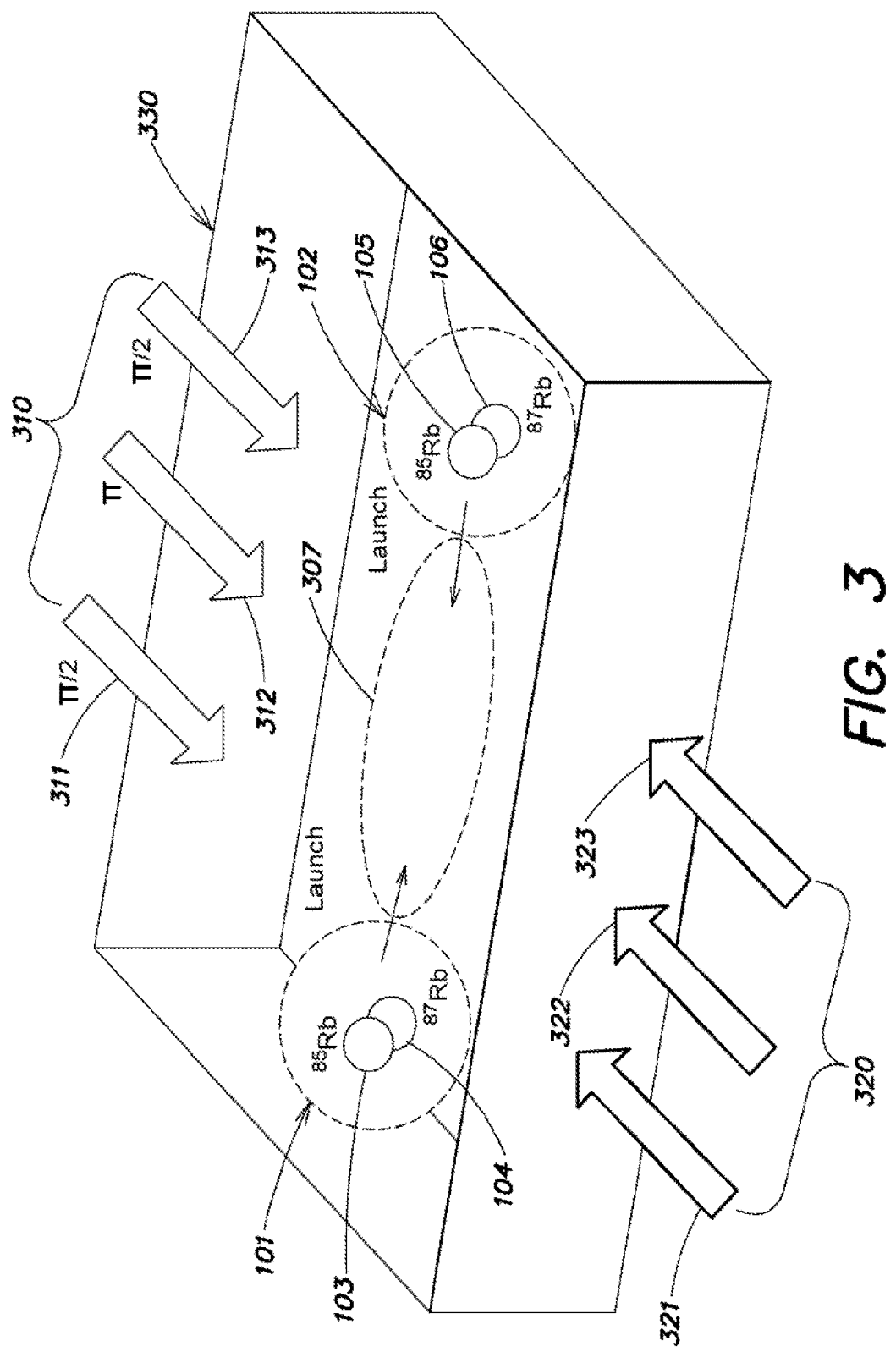
FIG. 3 is a schematic diagram of one example of an inertial measurement apparatus based on atom interferometry using counter propagating dual species atomic samples which are co-located in the same trapping sites according to aspects of the invention.

Referring to FIG. 1, there is illustrated one example of an atom interferometry measurement sequence using a laser light pulse sequence that creates two inertially sensitive signals, one for each atomic species. In one example, the laser light pulse sequence includes a pi/2-pi-pi/2 sequence of Raman transitions for each atomic species. However, in other examples, the light pulse sequence may include Bragg transitions, or may be any other form of light pulse sequence that creates an inertially sensitive signal. The measurement can include two samples of atoms, each containing more than one atomic species, each being transferred between respective atom capture sites, as discussed further below. Each atom sample, and each species, undergoes a pi/2-pi-pi/2 pulse sequence, but slight variations in the pulses for each interferometer may be allowed to compensate for the different Doppler shifts induced in each sample due to their common acceleration but different rotation rate. FIG. 2 is a corresponding flow diagram of the interferometry measurement sequence of FIG. 1. FIG. 3 is a schematic diagram showing the physical layout of two interferometry measurements of the type shown in FIG. 1 and described in FIG. 2.

Referring to FIGS. 1, 2 and 3, a first state 210 is a trapping and cooling state in which the atom samples 103 and 104 are trapped at an atom capture site 101 and cooled to a temperature suitable for operation of the LPAI system, typically 10 micro-Kelvin. Atom samples 105 and 106 are trapped in the same fashion as atom samples 103 and 104 at another atom capture site 102. In one embodiment, the atom capture sites 101 and 102 may include a magneto-optical trap (MOT), as discussed further below. In another embodiment, the atom capture sites 101 and 102 may include a magnetic trap. In yet another embodiment, the atom capture sites 101 and 102 may include an optical dipole trap. In other embodiments, the atom capture sites 101 and 102 may include any atom trapping and cooling mechanism. The atoms are then launched in a direction toward the other capture site 102 or 101, as described above (step 220). The atom samples may be launched with an initial velocity, $V_L$, as represented by arrow 108, such as an initial velocity of approximately 4 m/s. In one example, this launch 220 may be done via a moving molasses obtained by changing the frequencies of the MOT beams so that the atom is cooled in a moving frame with respect to the instrument case. After launching, the atom samples 103, 104, 105, and 106 may be prepared in a specific atomic state (state preparation step 230). In other examples, the state preparation step 230 may be unnecessary. In some embodiments, the specific atomic state in which the atom samples 103, 104, 105, and 106 are prepared is the mF=0 magnetically insensitive hyperfine ground state of an alkali atom. The atoms samples 103, 104, 105, and 106 may be placed into the mF=0 state by dark state optical pumping. An interferometry sequence 118 is then applied to the trapped and cooled atom samples 103, 104, 105, and 106, which includes applying a light pulse sequence to the atom samples 103, 104, 105, and 106 and generating a measurement based on interference of the atom sample.

In LPAI, a light pulse sequence is provided by Raman laser beams to atoms that are in transit from the initial atom capture site 101 (for samples 103 and 104) to the second atom capture site 102. During transit, the atom samples 103, 104, 105, and 106 are manipulated by light pulses configured to "split" and "reflect" atoms in order to create an atom interferometer. The light pulses may be provided by an optical apparatus or assembly 310 and 320 which is attached to a platform or housing 330 of the inertial measurement apparatus. The optical apparatus 310 and 320 may serve multiple atom interferometry regions and may be a shared component between instruments, as discussed further below.

In one example, the light pulse sequence includes a pi/2-pi-pi/2 sequence as shown in FIG. 1, which is a three-pulse sequence based on Raman transitions. A first Raman pi/2 pulse comprising two oppositely directed beams 120a and 120b, is applied to act as an atom "splitter," thereby placing the atom samples 103 and 104 in a coherent superposition of wavepackets 110 (corresponding to sample 103) and 111 (corresponding to sample 104) in states 140 and 141 having different momenta (step 240 in FIG. 2). Application of the first Raman pi/2 pulse results in separation of the wavepackets after an interrogation time T, as illustrated schematically by solid line 112a and dotted line 122b. Thus, the atoms from both wavepackets 110 and 111 that are in state 141 traverse the path indicated by line 122a to produce separated wavepackets 112a (from atom sample 103) and 113a (from atom sample 104). Similarly, the atoms from both wavepackets 110 and 111 that are in state 140 traverse the path indicated by dotted line 122b to produce separated wavepackets 112b (from atom sample 103) and 113b (from atom sample 104). A Raman pi pulse, also comprising two oppositely directed beams 120c and 120d, is then applied to act as an atom "mirror," thereby redirecting the momenta of the separated wavepackets 112a, 112b, 113a, and 113b so that the wavepackets follow trajectories 123a and 123b and overlap after a time T, producing superimposed wavepackets 114 and 115, as illustrated in FIG. 1 (step 250 in FIG. 2). A second Raman pi/2 pulse (beams 120e and 120f) is then applied to cause interference between the atoms in different states 140 and 141 in each wavepacket 114 and 115 to make the measurement resulting in separated outputs 116a, 117a (on paths 124a, 124b), and 116b, 117b (on paths 124c, 124d); (step 260). Accordingly, in various embodiments, an atom interferometer may include at least two atom beam splitters configured to provide pi/2 pulses and an atom mirror configured to provide pi pulses. The detection pulse (step 270) includes providing the measurement of interference, as discussed further below. The same sequence occurs simultaneously for the atom samples 105 and 106, where they transition through the Raman beams 120a, 120b, 120c, 120d, 120e, and 120f in the opposite order of that described above.

It is to be appreciated that the light pulse interferometry sequence of FIG. 1 is provided as one example and various embodiments may include atom interferometers configured to provide other light pulse sequences, and manipulate the atoms in other atomic states. Furthermore, atom interferometers may use the same laser beam delivery optics for cooling and trapping as well as measuring the inertial signal of the atoms, or may use different laser beams. Either configuration may be used in the embodiments discussed herein.

The sequence of FIGS. 1 and 2 may be applied to each of one or more atom samples to perform inertial measurements. As discussed above, according to certain embodiments, multiple atom species are multiplexed within the same inertial measurement apparatus in order to increase the number of measurements that can be made within a given time frame or measurement cycle, and additionally the atom samples may be recaptured and reused from one measurement to another.

FIG. 3 illustrates an example physical layout of a dual atomic species accelerometer and gyroscope apparatus that can be used for cooling and trapping the multiple atomic species used within a multi-frequency, multi-species light pulse atom interferometer, according to certain embodiments. The atomic accelerometer and gyroscope apparatus may include an ultra-high vacuum chamber 330 which contains two three-dimensional magneto-optical traps located at 101 and 102. A light pulse sequence is also illustrated in FIG. 3 by Raman laser beams 311, 312, 313, 321, 322, and 323. Similar to the configuration discussed above in reference to FIG. 1, a first Raman pi/2 pulse comprises two oppositely directed beams 311 and 321, a Raman pi pulse comprises two oppositely directed beams 312 and 322, and a second pi/2 pulse comprises two oppositely directed beams 313 and 323.

Figure 4:
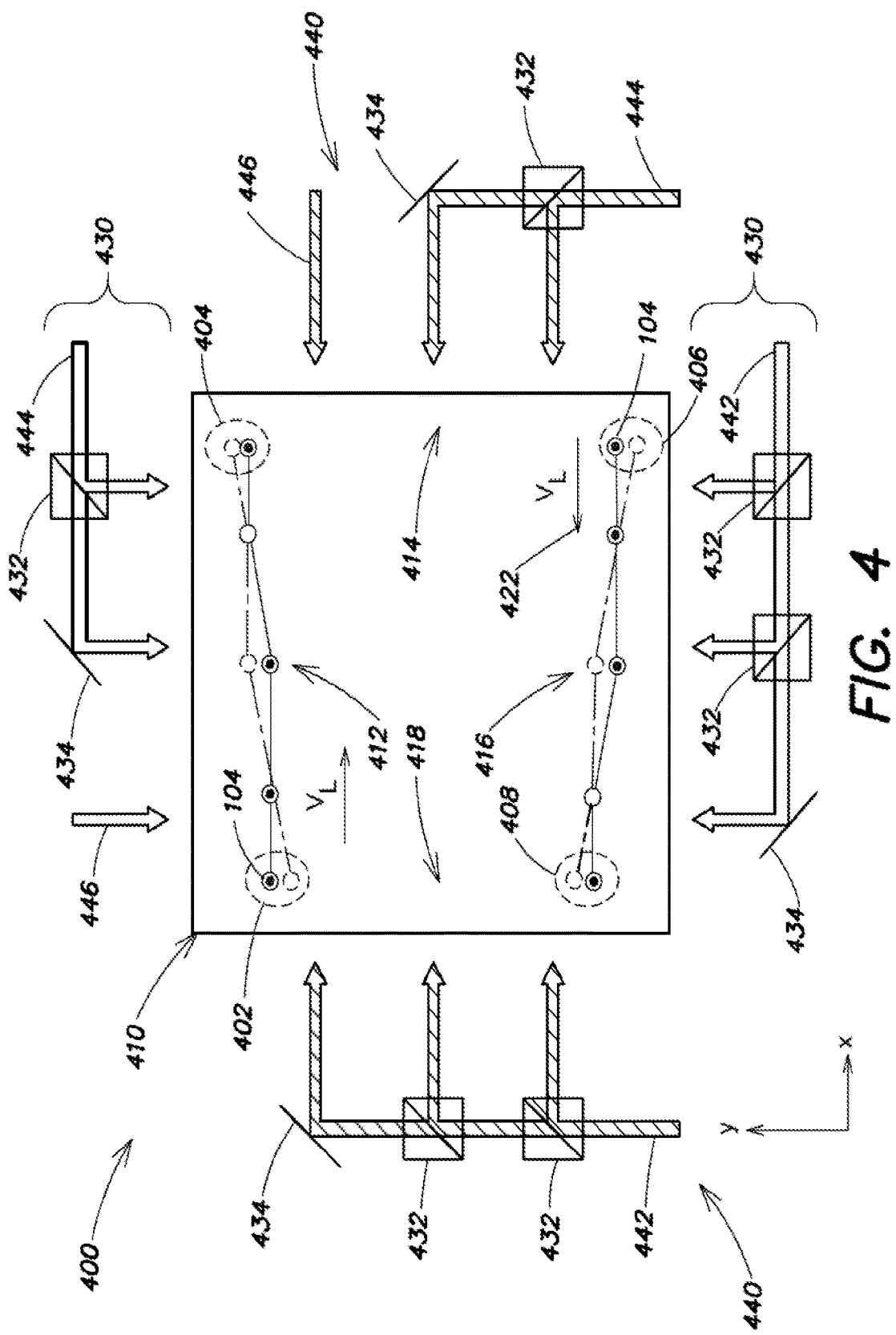
FIG. 4 is a schematic diagram of one example of an inertial measurement apparatus based on atom interferometry using counter-propagating atom samples according to aspects of the invention.
Figure 7:
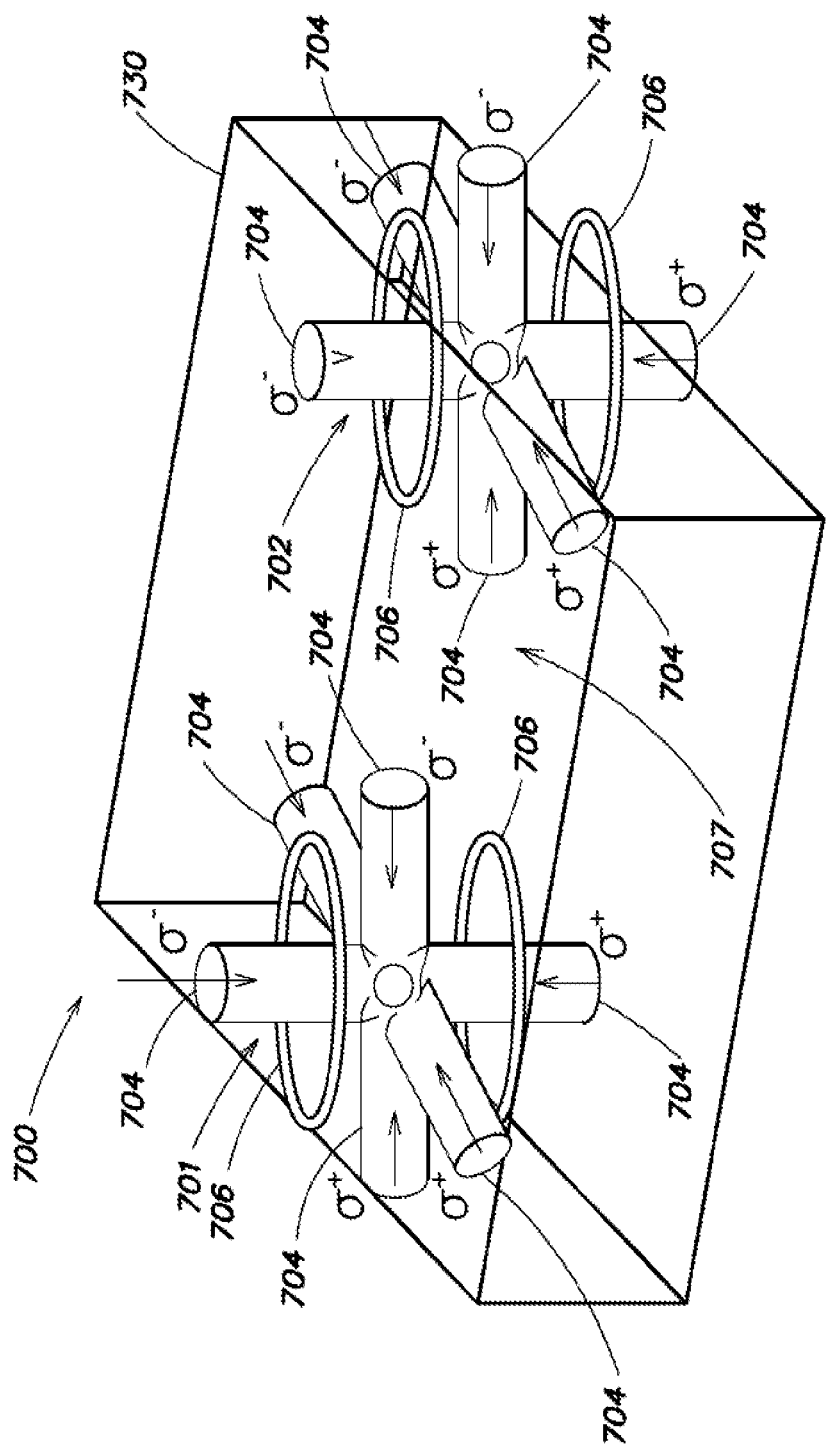
FIG. 7 is an illustration of one example of an apparatus that includes a multiple frequency, multiple species magneto-optical trap, which may be used as one or more components for various light pulse atom interferometer devices according to aspects of the present invention.

One or more magneto-optical traps can be combined with Raman lasers to produce multiple species LPAI in a variety of configurations, including the configurations shown in FIGS. 4 and 7, for example. According to one embodiment, an inertial measurement apparatus based on atom interferometry may include a plurality of atom capture sites arranged in a ring configuration (e.g., FIG. 4), with atom interferometry regions (e.g., interferometry region 307 in FIGS. 3, 412, 414, 416, and 418 in FIGS. 4, and 707 in FIG. 7) disposed between each pair of atom capture sites, and each atom capture site includes a magneto-optical trap. Since the atom motion is small at short interrogation times, the atoms can be efficiently recaptured at the next atom capture site. This enables high data rate by allowing significant re-capture between interferometer cycles, shortening the MOT loading times. In addition, temporal interleaving or multiplexing of separate atomic species between capture sites allows for even higher data rates by allowing for continuous interrogation of different atomic species. By independently controlling the launch, probe and capture of separate atomic species, different types of measurements can also be performed simultaneously within the same volume. For example, one species can be configured for performing the functions of an atomic clock, while a different species can be configured to perform the function of an accelerometer, and a separate species can be configured to perform the function of a magnetometer. When each supported atomic species is resonant at a different frequency, each species can be controlled independently within the same spatial volume.

FIG. 4 schematically illustrates an example of an inertial measurement apparatus 400 having a ring configuration. In this example, the inertial measurement apparatus includes four atom capture sites 402, 404, 406, and 408 with four atom interferometers, or atom interferometry regions 412, 414, 416, 418, each disposed between a respective pair of the atom capture sites. A magneto-optical trap is located at each atom capture site 402, 404, 406, and 408. In this example, the ring configuration is a square configuration, wherein each atom interferometry region forms one edge of the square. In other examples, the ring configuration may include another arrangement of any number of atom interferometry regions that are configured to transfer atoms between one another. For instance, the ring configuration may include a triangle configuration, a polygon configuration, or an L-shaped configuration where the atoms traverse out each arm of the L during one measurement and then return during the next. The interferometers do not need to share the same plane and do not need to be orthogonal. Additionally, multiple interferometers may traverse each measurement region in either the same or opposite directions between the cooling and trapping sites. Various examples of inertial measurement apparatuses having ring configurations, and exemplary operation thereof, are discussed in co-pending, commonly-owned, U.S. application Ser. No. 14/214,767 titled "RING ARCHITECTURE FOR SEQUENTIAL OPERATION OF AN ATOMIC GYROSCOPE," filed on Mar. 15, 2014, which is herein incorporated by reference in its entirety for all purposes.

Atom samples or test masses of one or more atom species may be trapped, cooled, and prepared for launch at the atom capture sites 402, 404, 406, and 408. As discussed in more detail below, to perform acceleration and rotation measurements (for example, to provide an atomic gyroscope), two counter-propagating laser cooled atomic test masses 104 for each of the multiplexed atomic species can be launched along counter-directional paths within a magnetic shielding 410, as shown in FIG. 4. The test masses may be launched with an initial non-zero velocity, $V_L$, represented by arrow 422. While traveling on a trajectory away from one atom capture site toward another, through one of the interferometry regions 412, 414, 416, 418, the various atomic species can be probed by collinear multi-frequency Raman or Bragg laser beams capable of providing an interferometry sequence, such as the pi/2-pi-pi/2 sequence described above, for example. Accordingly, the inertial measurement apparatus 400 further includes one or more optical assemblies or apparatuses 430, 440 configured to produce the light pulses used for the atom interferometry sequences. The optical assemblies may serve multiple atom interferometry regions, and may also be shared with the MOT optics for trapping and cooling the atom samples at each atom capture site. For example, as shown in FIG. 4, a first optical apparatus 430 may serve first and third atom interferometry regions 412, 416, and a second optical apparatus 440 may serve second and fourth atom interferometry regions 414, 418.

In one implementation, the Raman beams 120a, 120b, 120c, 120d, 120e, and 120f used in the interferometry sequence 118 are formed by retro-reflecting three, spatially distinct laser beams from a common (or separate) mirror. Each laser beam contains the frequencies required to create a Raman transition for a target atomic species. In another implementation, the Raman beams 120a, 120b, 120c, 120d, 120e, and 120f are formed from a single large laser beam that spans the entire atom trajectory to be used in the interferometer. In another implementation, the three Raman beam pairs 120a, 120b, 120c, 120d, 120e, and 120f are formed from spatially distinct laser beams which are in counter-propagation. Each beam contains one or more frequencies with at least one set of counter-propagating frequency pairs which will cause the atoms to undergo a Raman transition. In the example illustrated in FIG. 4, the three Raman beam pairs 120a, 120b, 120c, 120d, 120e, and 120f of FIG. 1 may be formed from three frequency tunable sources 442, 444, and 446 which allow for two distinct pairs of Raman frequencies that can be steered independently, but share one common laser beam between them. Beamsplitters 432 and fold mirrors 434 may be used to split and direct the laser beams from the frequency tunable sources to provide the three Raman beam pairs. In other examples, the optical assemblies 420, 430 are configured to produce Bragg beams, rather than Raman beams, as will be appreciated by those skilled in the art, given the benefit of this disclosure.

The frequency tunable sources 442, 444, and 446 may be tunable so as to adjust the frequencies of the Raman laser beams in such a way as to track the Doppler shift of the atoms with respect to the instrument case. Thus, all of the Raman transitions can be operated on resonance. In the example illustrated in FIG. 4, each optical apparatus includes a pair of each frequency tunable source, so as to produce counter-propagating laser beams in the interferometry regions 412, 414, 416, and 418 for the interferometry interrogation sequence. However, in other examples retroreflectors may be used to replace some of the frequency tunable sources in one or more of the optical assemblies. According to certain embodiments, the frequency tunable sources may be tunable to sequentially produce laser beams of different frequencies tailored for interaction with different target atom species, such that multiple different atom species can be interrogated in the interferometry regions 412, 414, 416, and 418 to provide different inertial measurements. Additionally, in some embodiments, the same frequency tunable sources may be used to trap, cool, and interrogate the atom samples, whereas in other embodiment, separate optical apparatuses are used for cooling and trapping in the magneto-optical traps at the atom capture sites 402, 404, 406, and 408 and interrogating the atom samples in the interferometry regions 412, 414, 416, and 418.

Thus, in one embodiment, a first tunable, multi-wavelength laser source is provided for optically trapping multiple atomic species having different resonant frequencies, and a second tunable, multi-wavelength laser source is provided for optically probing multiple distinct atomic species via Raman or Bragg pulses. In another embodiment, external optics are incorporated into the optical apparatus to provide beam combining of multiple laser sources having different frequencies corresponding to the resonances of multiple atomic species. In some embodiments, the wavelength beam combined laser sources are used for optically trapping multiple distinct atomic species within a single spatial volume. In various embodiments, wavelength beam combined laser sources are used for probing the multiple atomic species with distinct Raman or Bragg pulses at distinct frequencies associated with each distinct atomic species.

By using multiple collinear laser frequency sources that interact with different atomic species, the launching and probing of various atomic species can be temporally multiplexed to allow for continuous inertial measurements to be performed within a single spatial volume. While one species is being cooled and trapped, another species can be launched and interrogated. In various embodiments, the launching and probing of multiple atomic species can be overlapped in both space and time. By spatially and temporally overlapping the launching and probing of multiple atomic species, the measurements performed on each species can be used as a redundancy check that reduces biasing errors related to magnetic field shifts or AC Stark shifts in any single inertial measurement.

Those skilled in the art will appreciate, given the benefit of this disclosure, that there are numerous implementations of the optical apparatuses used to produce the frequency-tunable laser beams needed to cool, trap, and interrogate the different target atom species used in various embodiments of inertial measurement apparatuses.

For various examples of multi-species LPAIs, and devices incorporating multi-species LPAI components, the optical trapping laser beams are comprised of multiple optical frequencies corresponding to those frequencies necessary for cooling and trapping of isotopes of various alkali and alkaline earth metals, including $^6$Li, $^7$Li, $^{23}$Na, $^{39}$K, $^{41}$K, $^{85}$Rb, $^{87}$Rb, $^{88}$Sr, $^{133}$Cs, and $^{174}$Yb. In some embodiments, the optical trapping laser beams required for trapping multiple atomic species can be derived from a single laser source, or a master-slave laser source arrangement, that is appropriately modulated such that the generated sidebands correspond to the energy transitions between the hyperfine atomic energy levels used within the constructed atomic interferometers. One example configuration relates to the simultaneous optical trapping of $^{85}$Rb and $^{87}$Rb whereby a single laser source generating a central frequency can be modulated as to provide the appropriate frequencies for transitioning $^{85}$Rb from the one hyperfine energy level to another hyperfine energy level as well as transitioning $^{87}$Rb from the one hyperfine energy level to the another hyperfine energy level. In other embodiments, multiple laser sources are overlapped using external optics to provide the optical trapping lasers used for cooling and trapping multiple atomic species within a single spatial volume.

According to certain embodiments, phase shift measurements based on the atom sample(s) 103, 104, 105, and 106 may be obtained after the atoms interfere during transit through the interferometry regions 412, 414, 416, and 418 of the inertial measurement apparatus 400 by measuring the population of atoms in each of the outputs 116a, 116b, 117a, and 117b of the interferometer system, as shown in FIG. 1. The output ports may include different atomic states such as the hyperfine ground states of the alkali atom, but may also include spatially separated states in the same atomic state. The phase shift measurement may be indicative of at least one of a rotation and acceleration relative to a respective inertial axis, along with other effects such as the atoms' interaction with magnetic and optical fields.

Figure 5A:
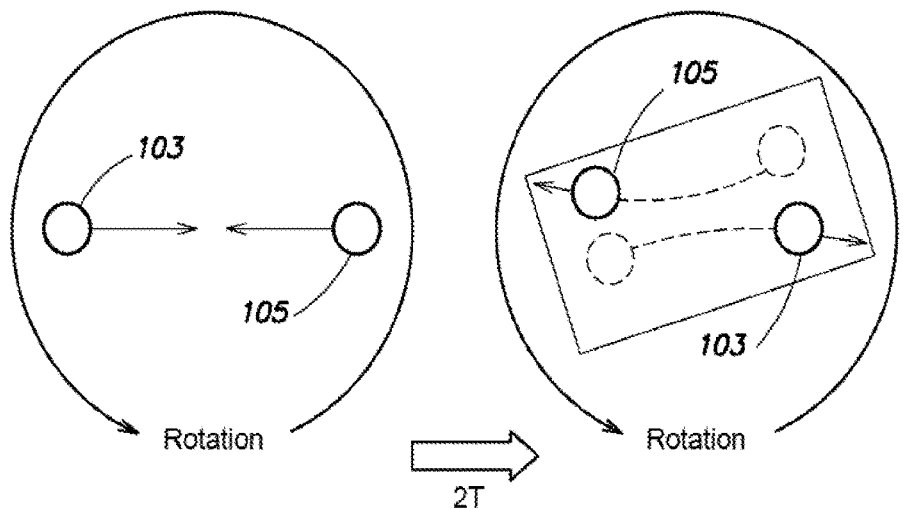
FIG. 5A is a schematic diagram illustrating a rotation measurement based on atom interferometry according to aspects of the invention.

FIG. 5A schematically illustrates a bi-directional "catch and throw" rotation measurement. As discussed above, the two atom samples 103, 105 are launched towards one another (in counter-propagating directions). The interferometry sequence discussed above may be applied during time 2T. The same effect occurs for samples 104 and 106 (not shown). Deflection of the atom samples 103, 105 (and 104 106) at the receiving atom capture site may be measured and provides an indication of the degree of rotation of the system, according to the following equation:

$$\Omega \cong \frac{\varphi A - \varphi B}{4 k_{eff} V_L T^2} \quad (1)$$

In Equation (1) (and in Equation (2) below), $k_{eff}$ is the periodicity, $\Omega \times V_L \times T^2$ is proportional to the Coriolis deflection, and $\varphi A$ and $\varphi B$ are the measured phase shifts from the two simultaneously operated interferometers.

Figure 5B:
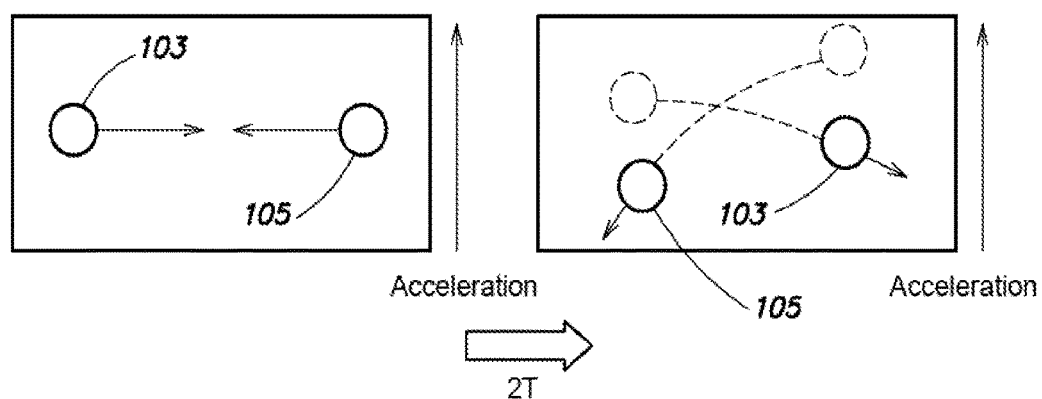
FIG. 5B is a schematic diagram illustrating an acceleration measurement based on atom interferometry according to aspects of the invention.

FIG. 5B schematically illustrates a bi-directional "catch and throw" acceleration measurement. As discussed above, the two atom samples 103, 105 are launched towards one another (in counter-propagating directions with vL1=−vL2). The same effect occurs for samples 104 and 106, which are not shown. The interferometry sequence discussed above may be applied during time 2T. Deflection of the atom samples 103, 105 (and 104, 106) at the receiving atom capture site may be measured and provides an indication of the acceleration of the system according to the following equation:

$$a \cong \frac{\varphi A + \varphi B}{k_{eff} T^2} \quad (2)$$

In Equation (2), $a \times T^2$ is proportional to the acceleration deflection.

Additionally, the measurement may include four simultaneous measurements, where each arm contains two counter propagating atomic samples which all interact with the same optical beam paths, though the light may be at different frequencies.

Such rotation and acceleration measurements may be made using the inertial measurement apparatus 400 of FIG. 4. The inertial measurement apparatus 400 may thus provide a combined atomic gyroscope and atomic accelerometer based on the recapturing configuration, as the two oppositely launched atom samples (reciprocal operation) allow for distinguishing between acceleration and rotation, for example by distinguishing between acceleration and rotation induced phase shifts.

Figure 6:
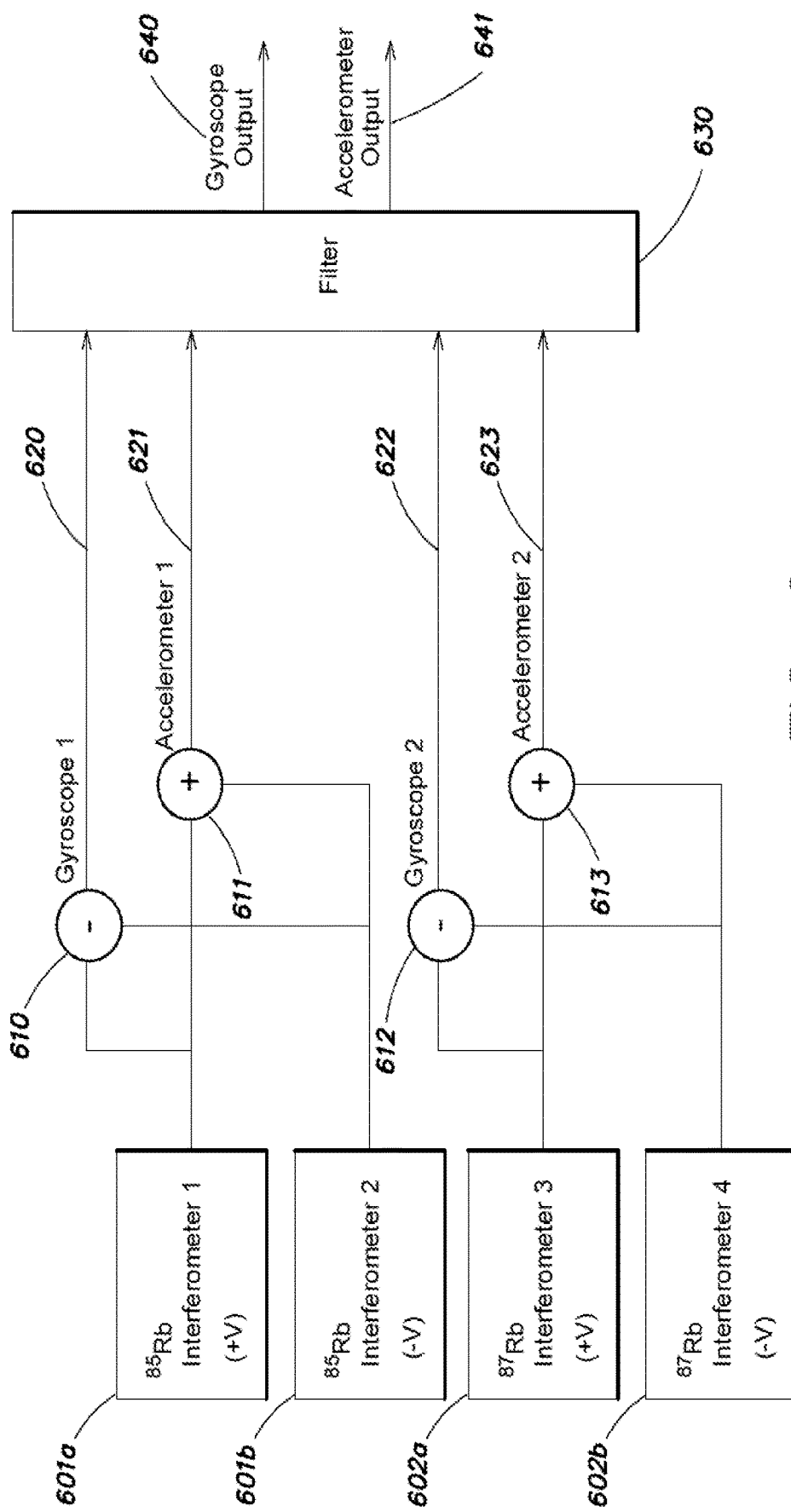
FIG. 6 is a flow diagram of one example of a process of taking inertial measurements using an inertial measurement apparatus configured to apply atom interferometry to one or more test masses of different atomic species, according to aspects of the present invention.

FIG. 6 is a flow diagram illustrating one example of performing an inertial measurement using samples (test masses) of two distinct atom species within an inertial measurement apparatus to take advantage of the different properties of the atomic species to improve the measurement. Each interferometer 601a, 601b, 602a, and 602b uses the sequence described in FIG. 1 and FIG. 2. The four interferometers 601a, 601b, 602a, 602b may be configured to start from atomic samples 103, 104, 105, and 106 as shown in FIG. 3. As discussed above, these measurements may be indicative of rotation and/or acceleration relative to an inertial reference frame.

Due to the weak equivalence principle and assuming rigid body motion of the instrument, the inertial acceleration signal of interferometers 601a, 601b, 602a, and 602b are identical and the inertial rotation signal of interferometers 601a and 602a are equal in magnitude but opposite in sign to interferometers 601b and 602b. Other non-inertial effects may be different among interferometers 601a, 601b, 602a, and 602b.

According to the effect shown in FIG. 5, interferometer 601b is subtracted from 601a at state 610 in FIG. 6 to form a gyroscope signal 620; interferometer 601a is added to 601b at state 611 to form an acceleration signal 621; interferometer 602b is subtracted from 602a at state 612 to form a gyroscope signal 622; and interferometer 602a is added to 602b at state 613 to form an acceleration signal 623.

Interferometers 601a, 601b, 602a, and 602b are sensitive to all forces on the atomic samples, including both inertial and non-inertial forces. The non-inertial forces may cause the gyroscope signals 620 and 622, and the accelerometer signals 621 and 623 to be incorrect. These non-inertial forces may be atomic species dependent. By combining gyroscope signals 620 and 622 from different atomic species in the filter 630, some non-inertial forces may be rejected, as the weak equivalence principle requires that the inertial gyroscope signals are the same for 620 and 622, but the non-inertial forces may be different. Similarly, by combining accelerometer signals 621 and 623 in the filter 630, some non-inertial forces may be rejected, as the weak equivalence principle requires that the inertial acceleration signals are the same for 621 and 623, but the non-inertial forces may be different.

Other signals, such as external magnetic field strength, electric field strength, instrument temperature, and non-atom-interferometer inertial measurements may also be used in filter 630 to aid in rejection of non-inertial forces on the atomic samples. The output of filter 630 includes corrected inertial acceleration 640 and rotation 641 signals which have non-inertial spurious effects removed by the combination of signals from different atomic species.

Thus, aspects and embodiments may provide light pulse atom interferometers that may operate as an inertial measurement apparatus, such as a gyroscope, accelerometer, or combination of both, and provide sequential operation over multiple axes. As discussed above, the light pulse atom interferometers may use Raman or Bragg transitions, or any other light pulse technique that creates an inertially sensitive signal. By multiplexing multiple atomic species and recapturing the atom samples, a highly efficient (low dead time, and efficient use of volume) measurement apparatus may be obtained.

According to another embodiment, the inertial measurement apparatus can be configured to provide dual simultaneous interferometers within the same instrument volume.

By taking the difference of the acceleration and rotation phase shifts for both atom species, the residual phase shifts may be determined. The residual phase shifts are $\phi_{symmetric}$ and $\phi_{antisymmetric}$. Both signals provide different information about the magnetic field (or any other systematic effect that has a different constant which is known or can be calibrated between the two interferometers). Thus, these signals can be used to correct for magnetic field effects. Magnetic field effects may be a large source of bias drift in an inertial sensor, and therefore being able to correct for magnetic field effects may be highly advantageous in some applications and enable better long-term sensor stability. For $^{85}$Rb and $^{87}$Rb interferometers 601a, 601b, 602a, 602b:

$\phi_{a\_85} + \phi_{b\_85} = \phi_{acceleraton} + \phi_{symmetric\_85}$ $\phi_{a\_87} + \phi_{b\_87} = \phi_{acceleraton} + \phi_{symmetric\_87}$ $\phi_{a\_85} - \phi_{b\_85} = \phi_{rotation} + \phi_{antisymmetric\_85}$ $\phi_{a\_87} - \phi_{b\_87} = \phi_{rotation} + \phi_{antisymmetric\_87}$ where interferometer 601a measures $\phi_{a\_85}$, 601b measures $\phi_{b\_85}$, 602a measures $\phi_{a\_87}$, and 602b measures $\phi_{b\_87}$. Performing Subtractions:

$(\phi_{A\_85} + \phi_{B\_85}) - k_{ratio}(\phi_{A\_87} + \phi_{B\_87}) =$
$\phi_{MagSymmetric\_85} - k_{ratio} * \phi_{MagSymmetric\_87}$ $(\phi_{A\_85} - \phi_{B\_85}) - k_{ratio}(\phi_{A\_87} - \phi_{B\_87}) =$
$\phi_{MagAntiSymmetric\_85} - k_{ratio} * \phi_{MagAntiSymmetric\_87}$ By applying a correction factor ($\phi_{correction}$) to the residual, and subtracting this from the $\phi_{acceleration}$ result, the "inertial only" contribution may be obtained. For example:

$$\phi_{MagSymmetric_{85}} - k_{ratio} * \phi_{MagSymmetric_{87}} = -2aT^3\alpha_{85}(\delta BB) \frac{\& k_{87}}{k_{85}} 2aT^3 \alpha_{87}(\delta BB)$$
$$= \delta\phi$$

$$\delta BB \rightarrow -\frac{\delta\phi k_{85}}{2aT^3(k_{85}\alpha_{85} - k_{87}\alpha_{87})}$$

$$\phi_{correction\_85} = -\frac{\delta\phi k_{85}}{2aT^3(k_{85}\alpha_{85} - k_{87}\alpha_{87})} * -2aT^3\alpha_{85} = \frac{\delta\phi k_{85}\alpha_{85}}{(k_{85}\alpha_{85} - k_{87}\alpha_{87})}$$

Referring again to FIG. 3, the atom capture sites 101 and 102 may be configured to simultaneously trap and cool two distinct atom species, such as $^{85}$Rb and $^{87}$Rb. Four atom clouds (test masses) may then be simultaneously launched into the interferometry region 307 (two clouds, one for each atom species, from each of the two atom capture sites 101, 102). Four simultaneous LPAI interferometric measurements may be performed by interrogating the atoms of both species in the interferometry region 307. At the end of the measurement cycle, the phase shift of the atoms may be read out for each interferometer (two detections, one for each species, at each atom capture site 101, 102 after the atoms have been recaptured). In one example, the phase shift measurements provide the following:

$\phi_a + \phi_b = \phi_{acceleration}$ (3)

$\phi_a - 100_b = \phi_{rotation}$ (4)

where $\phi_a$ may refer to the result of interferometer 601a or 602a, and $\phi_b$ may refer to the result of interferometer 601b or 602b.

The following example demonstrates the phase-shift response of a launched LPAI in the body frame of an inertial sensor to inertial and magnetic forces. In this example, the atoms are prepared in a first-order magnetic field insensitive state. Therefore, the Lagrangian governing the motion of the atoms is given by:

$$\mathcal{L} = \frac{m}{2} * (\vec{v} + \vec{\Omega} \times \vec{r}) \cdot (\vec{v} + \vec{\Omega} \times \vec{r}) + \left(m\vec{a} \cdot \vec{r} - \frac{1}{2}\hbar\alpha\vec{B} \cdot \vec{B}\right)$$

B may be defined as:

$$B = (B_x, B_y, B_z) + \begin{pmatrix} \frac{d}{dx}B_x & \frac{d}{dy}B_x & \frac{d}{dz}B_x \\ \frac{d}{dx}B_y & \frac{d}{dy}B_y & \frac{d}{dz}B_y \\ \frac{d}{dx}B_z & \frac{d}{dy}B_z & \frac{d}{dz}B_z \end{pmatrix} \cdot \vec{r}$$

The extension to adding higher order derivatives is straightforward, although may be computationally expensive. The atom is assumed to be in the $m_F=0$ state, and therefore, only the $2^{nd}$ order Zeeman coefficient,$\alpha$, is used, which varies between isotopes. For the following analysis, reference will be made to $\alpha_{85}$ and $\alpha_{87}$ for Rb85 and Rb87, respectively. The following quantities are used:

$\vec{v}$ is the velocity of the atom in the body frame;

$\vec{\Omega}$ is the rotation of the body frame with respect to inertial space;

$\vec{r}$ is the position of the atom in the body frame; and $\vec{a}$ is the acceleration of the body frame with respect to inertial space.

We solve for the atom trajectory for a given $\vec{\Omega}(t)$, and $\vec{a}(t)$ and initial conditions for $\vec{v}(t0)$ and $\vec{r}(t0)$ using a Taylor series approach by Euler-Lagrange for the classical equations of motion.

$$\frac{d}{dt}\frac{\partial}{\partial x_i'[t]}\mathcal{L} - \frac{\partial}{\partial x_i(t)}\mathcal{L} = 0$$

It is assumed that $x_i[t]=\Sigma_{n=0}^{order} a_{i,n}(t-t_0)^n$. Accordingly, 3*order equations may be formed to solve for $a_{i,n}$. This produces a solution for $x_i[t]$ which is correct to $(t-t_0)^{order-1}$. After the spatial trajectory of the atom is obtained over a known potential, the total phase shift may be constructed, as given by:

$$\Delta\emptyset_{total}=\Delta\emptyset_{laser}+\Delta\emptyset_{propogation}+\Delta\emptyset_{separation}$$

It certain cases, the quantity of most interest is the magnetic field phase-shift, which arises in propagation phase, because the trajectory modifications due to the magnetic fields are 100× smaller than earth rotation rate, and $10^5$× smaller than acceleration due to gravity.

In order to construct a system which can differentiate between acceleration and rotation phase shifts, two counter-propagating clouds launched with opposite velocities over nearly identical trajectories are used. The bold terms in Tables 1-5 below are the desired signal, and all the other terms are spurious effects which need to be controlled.

The difference between these two phase shifts is sensitive to rotation:

$$\emptyset_{rotation}=\emptyset_A-\emptyset_B=\emptyset_A(vL)-\emptyset_B(-vL)$$

TABLE 1

| | $\emptyset_{rotation}$ Term | $\emptyset$ (rad) | $\emptyset/\emptyset_{max}$ |
|---|---|---|---|
| 1 | $4\ T^2\ vLy\ \Omega z\ k_{eff}$ | 8.76499 | 1. |
| 2 | $4\ B0z\ T^2\ vLy\ \alpha\ \delta Byz$ | 0.39354 | 0.0448991 |
| 3 | $4\ B0y\ T^2\ vLy\ \alpha\ \delta Byy$ | 0.39354 | 0.0448991 |
| 4 | $4\ B0x\ T^2\ vLy\ \alpha\ \delta Byx$ | 0.39354 | 0.0448991 |
| 5 | $7\ az\ T^4\ vLy\ \alpha\ \delta Byz\ \delta Bzz$ | 0.020833 | 0.00237685 |
| 6 | $7\ az\ T^4\ vLy\ \alpha\ \delta Byy\ \delta Bzy$ | 0.020833 | 0.00237685 |
| 7 | $7\ az\ T^4\ vLy\ \alpha\ \delta Byx\ \delta Bzx$ | 0.020833 | 0.00237685 |
| 8 | $7\ ay\ T^4\ vLy\ \alpha\ \delta Byz^2$ | 0.020833 | 0.00237685 |
| 9 | $7\ ax\ T^4\ vLy\ \alpha\ \delta Bxz\ \delta Byz$ | 0.020833 | 0.00237685 |
| 10 | $7\ ay\ T^4\ vLy\ \alpha\ \delta Byy^2$ | 0.020833 | 0.00237685 |
| 11 | $7\ ax\ T^4\ vLy\ \alpha\ \delta Bxy\ \delta Byy$ | 0.020833 | 0.00237685 |
| 12 | $7\ ay\ T^4\ vLy\ \alpha\ \delta Byx^2$ | 0.020833 | 0.00237685 |
| 13 | $7\ ax\ T^4\ vLy\ \alpha\ \delta Bxx\ \delta Byx$ | 0.020833 | 0.00237685 |
| 14 | $2\ T^2\ \Omega z\ dvx_2\ k_{eff}$ | 0.000973888 | 0.000111111 |
| 15 | $4\ T^3\ vly\ \alpha\ \delta Bxz\ \delta Byz\ \hbar\ k_{eff}\ m$ | 0.00050921 | 0.0000580959 |
| 16 | $4\ T^3\ vly\ \alpha\ \delta Bxy\ \delta Byy\ \hbar\ k_{eff}\ m$ | 0.00050921 | 0.0000580959 |
| 17 | $4\ T^3\ vly\ \alpha\ \delta Bxx\ \delta Byx\ \hbar\ k_{eff}\ m$ | 0.00050921 | 0.0000580959 |
| 18 | $6\ T^3\ vLy\ \Omega x\ \Omega y\ k_{eff}$ | 0.0000795423 | 9.075 × $10^{-6}$ |
| 19 | $2\ B0z\ T^2\ \alpha\ \delta Byz\ dvx_2$ | 0.0000437267 | 4.98879 × $10^{-6}$ |
| 20 | $2\ B0y\ T^2\ \alpha\ \delta Byy\ dvx_2$ | 0.0000437267 | 4.98879 × $10^{-6}$ |

The sum of these two phase shifts is sensitive to acceleration:

$$\emptyset_{acceleration}=\emptyset_A+\emptyset_B=\emptyset_{A(vL)}+\emptyset_{B(-vL)}$$

TABLE 2

| | Acceleration Term | $\emptyset$ (rad) | $\emptyset/\emptyset_{max}$ |
|---|---|---|---|
| 1 | $2\ ax\ T^2\ k_{eff}$ | 48694.4 | 1. |
| 2 | $-4\ az\ T^3\ \Omega y\ k_{eff}$ | -0.589202 | -0.0000121 |
| 3 | $-4\ ay\ T^3\ \Omega z\ k_{eff}$ | 0.535638 | 0.000011 |
| 4 | $4\ T^3\ vLy^2\ \alpha\ \delta Byz^2$ | 0.194802 | 4.00051 × $10^{-6}$ |
| 5 | $4\ T^3\ vLy^2\ \alpha\ \delta Byy^2$ | 0.194802 | 4.00051 × $10^{-6}$ |
| 6 | $4\ T^3\ vLy^2\ \alpha\ \delta Byx^2$ | 0.194802 | 4.00051 × $10^{-6}$ |
| 7 | $4\ az\ B0z\ T^3\ \alpha\ \delta Bzz$ | 0.0240497 | 4.9389 × $10^{-7}$ |
| 8 | $4\ az\ B0y\ T^3\ \alpha\ \delta Bzy$ | 0.0240497 | 4.9389 × $10^{-7}$ |
| 9 | $4\ az\ B0x\ T^3\ \alpha\ \delta Bzx$ | 0.0240497 | 4.9389 × $10^{-7}$ |
| 10 | $4\ ay\ B0z\ T^3\ \alpha\ \delta Byz$ | 0.0240497 | 4.9389 × $10^{-7}$ |
| 11 | $4\ ay\ B0y\ T^3\ \alpha\ \delta Byy$ | 0.0240497 | 4.9389 × $10^{-7}$ |
| 12 | $4\ ay\ B0x\ T^3\ \alpha\ \delta Byx$ | 0.0240497 | 4.9389 × $10^{-7}$ |
| 13 | $4\ ax\ B0z\ T^3\ \alpha\ \delta Bxz$ | 0.0240497 | 4.9389 × $10^{-7}$ |
| 14 | $4\ ax\ B0y\ T^3\ \alpha\ \delta Bxy$ | 0.0240497 | 4.9389 × $10^{-7}$ |
| 15 | $4\ ax\ B0x\ T^3\ \alpha\ \delta Bxx$ | 0.0240497 | 4.9389 × $10^{-7}$ |
| 16 | $6\ ay\ az\ T^5\ \alpha\ \delta Byz\ \delta Bzz$ | 0.00109125 | 2.24103 × $10^{-8}$ |
| 17 | $6\ ax\ az\ T^5\ \alpha\ \delta Bxz\ \delta Bzz$ | 0.00109125 | 2.24103 × $10^{-8}$ |
| 18 | $6\ ay\ az\ T^5\ \alpha\ \delta Byy\ \delta Bzy$ | 0.00109125 | 2.24103 × $10^{-8}$ |
| 19 | $6\ ax\ az\ T^5\ \alpha\ \delta Bxy\ \delta Bzy$ | 0.00109125 | 2.24103 × $10^{-8}$ |
| 20 | $6\ ay\ az\ T^5\ \alpha\ \delta Byx\ \delta Bzx$ | 0.00109125 | 2.24103 × $10^{-8}$ |

Due to the above choices for the size of the magnetic field variation, all of the terms beyond the first rotation term and the first three acceleration terms are due to the magnetic fields. In order to eliminate these terms, consider a simple case of a dual isotope sensor, with only a field B0x and variation $\delta Bxx$ and $\delta Byx$:

$$\emptyset A85=k85*ax*(T)^2+k85*\Omega z*vLy*(T)^2+2\ ax\ B0x\ T^3\alpha\delta Bxx+2B0x\ T^2(vLy)\alpha\delta Byx;$$

$$\emptyset B85=k85*ax*(T)^2+k85*\Omega z*(-vLy)*(T)^2+2\ ax\ B0x\ T^3\alpha\delta Bxx+2B0x\ T^2(-vLy)\ \alpha\delta Byx;$$

$$\emptyset A87=k87*ax*(T)^2+k87*\Omega z*vLy*(T)^2+2\ ax\ B0x\ T^3\alpha\delta Bxx+2B0x\ T^2(vLy)\ \alpha\delta Byx;$$

$$\emptyset B87=k87*ax*(T)^2+k87*\Omega z*(-vLy)*(T)^2+2\ ax\ B0x\ T^3\ \alpha\delta Bxx+2B0x\ T^2(-vLy)\ \alpha\delta Byx;$$

$$\emptyset A85 - \emptyset B85 - \frac{k85}{k87}(\emptyset A87 - \emptyset B87) =$$

$$\delta\emptyset_{rotation} = 4B0xT^2vLy\delta Byx * \frac{k87\alpha 85 - k85\alpha 87}{k87}$$

$$\emptyset A85 - \emptyset B85 - \frac{k85}{k87}(\emptyset A87 - \emptyset B87) =$$

$$\delta\emptyset_{accel} = 4axB0xT^3\delta Bxx * \frac{k87\alpha 85 - k85\alpha 87}{k87}$$

It is then possible to solve for $\delta Bxx*B0x$ and $\delta Byx*B0x$. With that knowledge, a corrected acceleration can be produced, for non-recoil magnetic field variation. $K_{eff}$ allows for determining the recoil, from the non-recoil terms.

$$\Delta\phi_{mag,rotation,non\_recoil} = \frac{1}{2}\left(\frac{k_{85}}{k_{85}\alpha_{85} - k_{87}\alpha_{87}}\right)(\delta\phi_{rotation}(+k_{eff}) + \delta\phi_{rotation}(-k_{eff}))$$

$$\Delta\phi_{mag,accel,non\_recoil} = \frac{1}{2}\left(\frac{k_{85}}{k_{85}\alpha_{85} - k_{87}\alpha_{87}}\right)(\delta\phi_{accel}(+k_{eff}) + \delta\phi_{accel}(-k_{eff}))$$

For the recoil terms, terms are considered that are of the form:

$$-\frac{B0xk_{eff}T2\alpha\delta Bxx\hbar}{m}$$

$$\Delta\phi_{mag,rotation,recoil} = \frac{1}{2}\left(\frac{1}{\alpha_{85} - \alpha_{87}}\right)(\delta\phi_{rotation}(+k_{eff}) + \delta\phi_{rotation}(-k_{eff}))$$

$$\Delta\phi_{mag,accel,recoil} = \frac{1}{2}\left(\frac{1}{\alpha_{85} - \alpha_{87}}\right)(\delta\phi_{accel}(+k_{eff}) + \delta\phi_{accel}(-k_{eff}))$$

It is then possible to correct for the variation:

$$\phi_{rotation,corrected} = \phi_{rotation} - \Delta\phi_{mag,rotation,non\_recoil} - \Delta\phi_{mag,rotation,recoil}$$

TABLE 3

| | $\phi_{rotation,corrected}$ | $\phi$ (rad) | $\phi/\phi_{max}$ |
|---|---|---|---|
| 1 | $4 T^2$ vLy $\Omega z$ $k_{85}$ | 8.76499 | 1. |
| 2 | $2 T^2$ $\Omega x$ $dvx_2$ $k_{85}$ | 0.000974398 | 0.000111111 |
| 3 | $6 T^3$ vLy $\Omega x$ $\Omega y$ $k_{85}$ | 0.000079584 | $9.075 \times 10^{-6}$ |
| 4 | $2 B0z T^2$ $\delta Byz$ $dvx_2$ $\alpha_{85}$ | 0.0000313143 | $3.57079 \times 10^{-6}$ |
| 5 | $2 B0y T^2$ $\delta Byy$ $dvx_2$ $\alpha_{85}$ | 0.0000313143 | $3.57079 \times 10^{-6}$ |
| 6 | $2 B0x T^2$ $\delta Byx$ $dvx_2$ $\alpha_{85}$ | 0.0000313143 | $3.57079 \times 10^{-6}$ |
| 7 | $4 T^3$ vLy $\delta Byz^2$ $dvx_2$ $\alpha_{85}$ | 0.0000310012 | $3.53508 \times 10^{-6}$ |
| 8 | $4 T^3$ vLy $\delta Byy^2$ $dvx_2$ $\alpha_{85}$ | 0.0000310012 | $3.53508 \times 10^{-6}$ |
| 9 | $4 T^3$ vLy $\delta Byx^2$ $dvx_2$ $\alpha_{85}$ | 0.0000310012 | $3.53508 \times 10^{-6}$ |
| 10 | $2 T^2$ vLy $\delta Byz$ $\delta Bzz$ $dx_3$ $\alpha_{85}$ | 0.0000281829 | $3.21371 \times 10^{-6}$ |

$\phi_{accel,corrected} = \phi_{accel} - \Delta\phi_{mag,accel,non\_recoil} - \Delta\phi_{mag,accel,recoil}$

TABLE 4

| | $\phi_{accel,corrected}$ | "$\phi$ (rad)" | $\phi/\phi_{max}$ |
|---|---|---|---|
| 1 | $2 ax T^2 k_{85}$ | 48694.4 | 1. |
| 2 | $-4 az T^3$ $\Omega y$ $k_{85}$ | $-0.589511$ | $-0.0000121$ |
| 3 | $4 ay T^3$ $\Omega z$ $k_{85}$ | 0.535919 | 0.000011 |
| 4 | $2 T^2$ $\Omega z$ $dvx_2$ $k_{85}$ | 0.000974398 | $2. \times 10^{-8}$ |
| 5 | $2 B0z T^2$ $\delta Byz$ $dvx_2$ $\alpha_{85}$ | 0.0000313143 | $6.42742 \times 10^{-10}$ |
| 6 | $2 B0y T^2$ $\delta Byy$ $dvx_2$ $\alpha_{85}$ | 0.0000313143 | $6.42742 \times 10^{-10}$ |
| 7 | $2 B0x T^2$ $\delta Byx$ $dvx_2$ $\alpha_{85}$ | 0.0000313143 | $6.42742 \times 10^{-10}$ |
| 8 | $4 T^3$ vLy $\delta Byz^2$ $dvx_2$ $\alpha_{85}$ | 0.0000310012 | $6.36314 \times 10^{-10}$ |
| 9 | $4 T^3$ vLy $\delta Byy^2$ $dvx_2$ $\alpha_{85}$ | 0.0000310012 | $6.36314 \times 10^{-10}$ |
| 10 | $4 T^3$ vLy $\delta Byx^2$ $dvx_2$ $\alpha_{85}$ | 0.0000310012 | $6.36314 \times 10^{-10}$ |

In this example, it is expected to control $dvx_2$ to 10 μm/s instead of 1 mm/s, which will reduce these terms even further. Note that it is desirable keep all terms below 2 μrad. The non-desired terms are reduced by 100, and with $dvx_2 = 10$ μm/s, the total reduction is >1000.

TABLE 5

| | $\phi_{rotation,corrected}$ | $\phi$ (rad) | $\phi/\phi_{max}$ |
|---|---|---|---|
| 1 | $4 T^2$ vLy $\Omega z$ $k_{85}$ | 8.76958 | 1. |
| 2 | $6 T^3$ vLy $\Omega x$ $\Omega y$ $k_{85}$ | 0.000079584 | $9.075 \times 10^{-6}$ |

TABLE 5-continued

| | $\phi_{rotation,corrected}$ | $\phi$ (rad) | $\phi/\phi_{max}$ |
|---|---|---|---|
| 3 | $2 T^2$ vLy $\delta Byz$ $\delta Bzz$ $dx_3$ $\alpha_{85}$ | 0.0000140914 | $1.60685 \times 10^{-6}$ |
| 4 | $2 T^2$ vLy $\delta Byy$ $\delta Bzy$ $dx_3$ $\alpha_{85}$ | 0.0000140914 | $1.60685 \times 10^{-6}$ |
| 5 | $2 T^2$ vLy $\delta Byx$ $\delta Bzx$ $dx_3$ $\alpha_{85}$ | 0.0000140914 | $1.60685 \times 10^{-6}$ |
| 6 | $2 T^2$ vLy $\delta Byz^2$ $dx_2$ $\alpha_{85}$ | 0.0000140914 | $1.60685 \times 10^{-6}$ |
| 7 | $2 T^2$ vLy $\delta Byy^2$ $dx_2$ $\alpha_{85}$ | 0.0000140914 | $1.60685 \times 10^{-6}$ |
| 8 | $2 T^2$ vLy $\delta Byx^2$ $dx_2$ $\alpha_{85}$ | 0.0000140914 | $1.60685 \times 10^{-6}$ |
| 9 | $2 T^2$ vLy $\delta Bxz$ $\delta Byz$ $dx_1$ $\alpha_{85}$ | 0.0000140914 | $1.60685 \times 10^{-6}$ |
| 10 | $2 T^2$ vLy $\delta Bxy$ $\delta Byy$ $dx_1$ $\alpha_{85}$ | 0.0000140914 | $1.60685 \times 10^{-6}$ |

The first two terms of the rotation phase shift are the desired terms, with the non-desired terms reduced to ~140 μrad, and these are expected to vary stochastically as they depend on initial condition variation between the two isotopes. In other examples, and in practice, it is likely that the initial conditions of the two atom species will be significantly more correlated than a standard MOT position variation. Therefore the performance may be even better than predicted in this example.

Thus, aspects and embodiments provide for simultaneous cooling, trapping, and interrogating of multiple atom samples of different atom species or isotopes. In addition, aspects and embodiments provided for the recapture and reuse of these atom samples from one measurement to another. These features may provide inertial measurement systems with increased bandwidth (due to the ability to make multiple measurements simultaneously and reduced dead time between measurements due to recapture), and/or reduced system errors (such as bias errors, for example).

As discussed above, the atom capture sites can include any of a variety of atom trapping and cooling apparatuses, such as, for example, magneto-optical traps, magnetic traps, or optical dipole traps. FIG. 7 illustrates an example of a magneto-optical trapping apparatus 700 that may be used for cooling and trapping the multiple atomic species used within a multi-frequency, multi-species light pulse atom interferometer, according to certain embodiments. The magneto-optical trapping apparatus 700 can include an ultra-high vacuum chamber 730 which contains one or more three-dimensional magneto-optical traps. According to the embodiment shown in FIG. 7, the magneto-optical trapping apparatus contains two magneto-optical traps 701 and 702. The principle components of each magneto-optical trap 701 and 702 include a set of six optical trapping laser beams 704 that are slightly red-detuned from the atomic resonance of the target atomic species, and which are directed to a central point along three orthogonal axes. The three-dimensional magneto-optical trap may also include a set of magnetic coils 706 that can produce a gradient quadrupole magnetic field. The gradient magnetic field induces a radially variant Zeeman shift in the hyperfine atomic energy levels targeted for trapping a particular atomic species. Coupled with the cooling lasers, the radially variant Zeeman shift produced by the magnetic coils 706 acts to shift the hyperfine atomic energy level of a target species closer to the red-detuned laser frequency as an atom moves further away from the center of the magneto-optical trap 701 and 702. This phenomenon provides a force that counteracts the movement of atoms away from the center of magneto-optical trap. The apparatus 700 shown in FIG. 7 also includes an atom interferometry regions 707 disposed between the pair of atom capture sites 701 and 702, similar to the atom interferometry region 307 discussed above in reference to FIG. 3.

Although not shown in FIG. 7, in certain instances atomic species can be initially introduced to the three-dimensional magneto-optical trapping chamber 730 from an atomic beam that is ejected from a separate magneto-optical trapping chamber.

One or more magneto-optical traps can be combined with Raman pumping lasers to produce multiple species LPAI in a variety of configurations. Besides the embodiment shown in FIG. 7, other configurations may include a plurality of atom capture sites arranged in a ring configuration, such as the apparatus shown in FIG. 4, with atom interferometry regions disposed between each pair atom capture sites, and each atom capture site including a magneto-optical trap.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

The invention claimed is:

1. An inertial measurement apparatus based on atom interferometry and comprising:
   a vacuum chamber;
   first and second atom capture sites housed within the vacuum chamber, each of the first and second atom capture sites being selectively configured to trap and cool first and second atom samples of distinct atom species;
   an atom interferometry region disposed between the first and second atom capture sites; and
   first and second atom interferometers operating in the atom interferometry region, the first atom interferometer being configured to generate a first measurement corresponding to a common inertial input based on the first atom sample, and the second atom interferometer being configured to generate a second measurement corresponding to the common inertial input based on the second atom sample;
   wherein the first atom capture site is configured to launch the first atom sample into the atom interferometry region, and to recapture the second atom sample from the atom interferometry following the second measurement; and
   wherein the second atom capture site is configured to launch the second atom sample into the interferometry region, and to recapture the first atom sample from the atom interferometry region following the first measurement.

2. The inertial measurement apparatus of claim 1, wherein each of the first and second atom capture sites includes a magneto-optical trap.

3. The inertial measurement apparatus of claim 1, wherein the first and second atom capture sites are configured to launch captured atoms at an initial non-zero velocity.

4. The inertial measurement apparatus of claim 1, wherein the first atom interferometer is configured to apply a first light pulse sequence to atoms of the first atom sample as the atoms traverse the atom interferometry region; and
   wherein the second atom interferometer is configured to provide a second light pulse sequence to atoms of the second atom sample as the atoms traverse the atom interferometry region.

5. The inertial measurement apparatus of claim 4, wherein the first and second light pulse sequences are Raman pulse sequences.

6. The inertial measurement apparatus of claim 4, wherein the first atom interferometer includes a first optical assembly configured to provide the first light pulse sequence, and the second atom interferometer includes a second optical assembly configured to provide the second light pulse sequence.

7. The inertial measurement apparatus of claim 1, wherein each of the first and second atom capture sites includes an optical dipole trap.

8. An inertial measurement apparatus based on atom interferometry and comprising:
   a vacuum chamber;
   an atom interferometry region located within the vacuum chamber;
   at least one atom capture site housed within the vacuum chamber and configured to trap and cool a first atom sample of a first atom species and a second atom sample of a second atom species, the first and the second atom species being distinct from one another and having different physical properties, the at least one atom capture site being configured to launch the first and the second atom samples into the atom interferometry region; and
   first and second atom interferometers operating in the atom interferometry region, the first atom interferometer being configured to generate a first measurement corresponding to a common inertial input based on the first atom sample, and the second atom interferometer being configured to generate a second measurement corresponding to the common inertial input based on the second atom sample.

9. The inertial measurement apparatus of claim 8, wherein the at least one atom capture site is further configured to recapture the first and the second atom samples from the atom interferometry region following the first and the second measurements, respectively.

10. The inertial measurement apparatus of claim 8, wherein the at least one atom capture site includes a first atom capture site and a second atom capture site, the first atom capture site being configured to launch the first atom sample into the atom interferometry region and to recapture the second atom sample from the atom interferometry region following the second measurement, and the second atom capture site being configured to launch the second atom sample into the interferometry region and to recapture the first atom sample from the atom interferometry region following the first measurement.

11. The inertial measurement apparatus of claim 10, further comprising a third atom interferometer operating in the atom interferometry region and configured to generate a third measurement based on the first atom sample.

12. The inertial measurement apparatus of claim 11, further comprising a fourth atom interferometer operating in the atom interferometry region and configured to generate a fourth measurement based on the second atom sample.

13. The inertial measurement apparatus of claim 8, wherein the at least one atom capture site includes one of a magneto-optical trap, a magnetic trap, and an optical dipole trap.

14. The inertial measurement apparatus of claim 8, wherein the at least one atom capture site is configured to launch the first and second atom samples at an initial non-zero velocity.

15. The inertial measurement apparatus of claim 8, wherein the first atom interferometer is configured to apply a first light pulse sequence to the first atom sample as the first atom sample traverses the atom interferometry region; and wherein the second atom interferometer is configured to provide a second light pulse sequence to the second atom sample as the second atom sample traverses the atom interferometry region.

16. The inertial measurement apparatus of claim 15, wherein the first and the second light pulse sequences are Raman pulse sequences.

17. The inertial measurement apparatus of claim 15, wherein the first and the second light pulse sequences are pi/2-pi-pi/2 sequences.

18. The inertial measurement apparatus of claim 15, wherein the first atom interferometer includes a first optical assembly configured to provide the first light pulse sequence, and the second atom interferometer includes a second optical assembly configured to provide the second light pulse sequence.

19. The inertial measurement apparatus of claim 8, wherein the atom interferometry region is spatially separated from the at least one atom capture site.

20. The inertial measurement apparatus of claim 8, wherein the at least one atom capture site is spatially co-located with the atom interferometry region.

* * * * *